June 6, 1961 K. GEBELE 2,986,978
PHOTOGRAPHIC CAMERA WITH INTERCHANGEABLE OPTICAL UNIT
Filed March 16, 1959
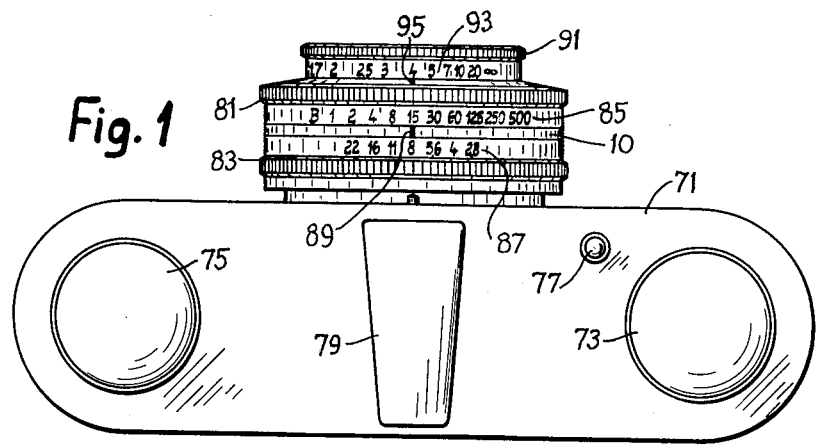
Fig. 1
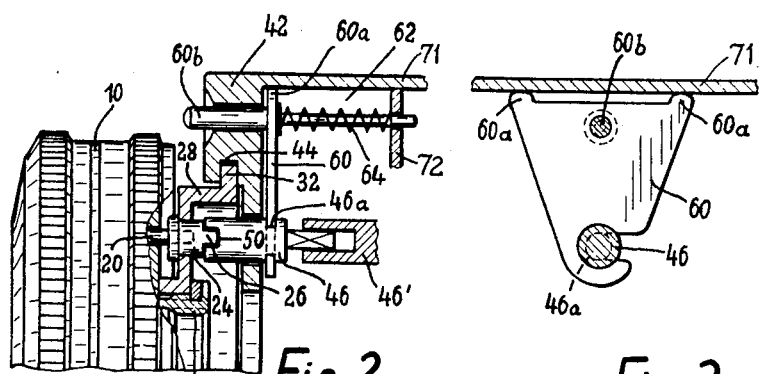 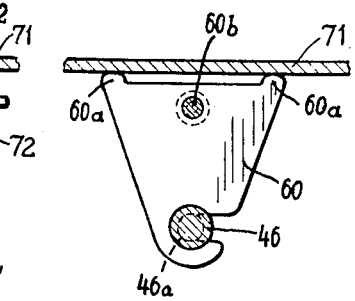
Fig. 2  Fig. 3
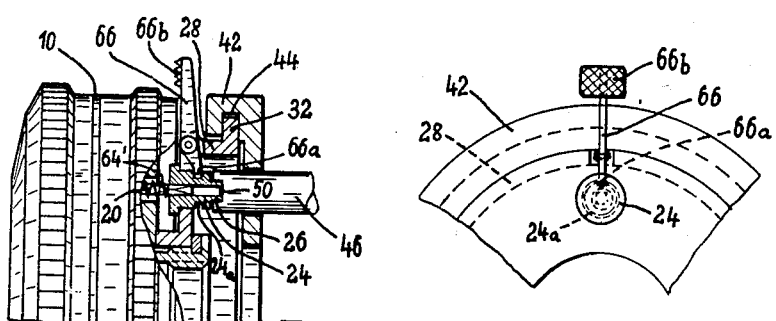 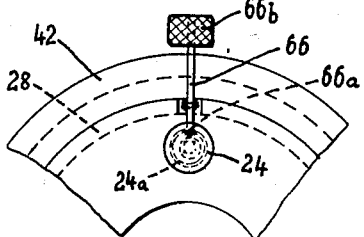
Fig. 4  Fig. 5

United States Patent Office 2,986,978
Patented June 6, 1961

2,986,978
PHOTOGRAPHIC CAMERA WITH INTERCHANGEABLE OPTICAL UNIT
Kurt Gebele, Munich, Germany, assignor to Compur-Werk Friedrich Deckel O.H.G., Munich, Germany, a firm of Germany
Filed Mar. 16, 1959, Ser. No. 799,704
Claims priority, application Germany Mar. 25, 1958
7 Claims. (Cl. 95—11)

The present invention relates to a photographic camera having an interchangeable optical unit (shutter or lens or both) controllable from the camera body and, more particularly, to the mechanism for transmitting the control actions from the camera body to the interchangeable unit, this mechanism being of the kind which serves as a lock for preventing the interchangeable unit from being detached and replaced unless the mechanism in the camera and in the interchangeable unit are in predetermined operational positions.

An object of the invention is to provide a generally improved and more satisfactory transmission mechanism for the shutter tensioning and release operations of a camera of the type having an interchangeable optical unit, the transmission mechanism being disconnected when the interchangeable unit is detached and replaced.

Another object is the provision of a new and improved transmission mechanism for the control actions of an interchangeable optical unit of the kind which can be disengaged normally only when the mechanisms on the camera and on the interchangeable unit are in predetermined operational positions, the transmission mechanism of the present invention being arranged so that the unit may be disengaged even when faults occur which prevent the mechanism from moving to the correct predetermined operational positions required for normal disengagement.

Yet another object is to provide a new and improved transmission mechanism for the shutter triggering and release operations to an interchangeable shutter or similar optical unit which can ordinarily be disengaged only when the relevant parts are in a predetermined position, but which can also be disengaged when faults arise which prevent these parts from taking this predetermined position.

These and other desirable objects may be attained in the manner disclosed as an illustrative embodiment of the invention in the following description and in the accompanying drawings forming a part hereof, in which:

FIG. 1 is a top plan view of a camera and interchangeable optical unit according to the present invention;

FIG. 2 is a fragmentary view partly in side elevation and partly in radial cross-section of an interchangeable optical or objective unit detachably secured to a camera body and provided with a disengageable transmission according to a first embodiment of the invention;

FIG. 3 is a front view and section in a plane normal to the optical axis of a portion of the mechanism shown in FIG. 2;

FIG. 4 is a view similar to FIG. 2 illustrating a transmission according to a second embodiment of the invention; and FIG. 5 is a front view in a plane normal to the optical axis of a portion of the mechanism shown in FIG. 4.

The same reference numerals throughout the several views indicate the same parts.

The invention is particularly but not exclusively useful in a miniature camera, of the single lens reflex focusing type, such cameras being well known, and will be described with regard to such use in the preferred embodiments. When it is desired to use this camera with various different kinds or types of lenses, such as an ordinary lens, a wide angle lens, or a telephoto lens, it may be more convenient and quicker to detach the entire optical unit comprising the shutter and the lens or objective, and lay it aside, and attach to the camera a different unit comprising another shutter with a different lens mounted therein, than it would be merely to change the lens itself. This detachment and replacement of the entire shutter assembly can be done safely if suitable precautions are taken to avoid entrance of light and fogging the film during the time that the shutter is removed from the camera body. In certain kinds of known cameras of the single lens reflex type, for example, the film is protected from access of light whenever the shutter is in tensioned or cocked condition, the light to the film being cut off at this time either by separate blades, or by means of the reflex mirror itself. In these known kinds of reflex cameras, the actuating of the film winding or film transport member serves at the same time to cock or tension the shutter, and also to move the reflex mirror into viewing position, thereby shutting off the light which comes through the now open shutter, so that such light does not reach the sensitized film. In this operational position the shutter or objective may safely be exchanged.

Since the details of such a camera, other than the parts to be mentioned, are well known, they need not be specifically disclosed here. Referring first to FIG. 1 a camera body 71 is disclosed having a film winding knob 73, a rewind knob 75, and a shutter release button 77 of any suitable construction. A view finder 79 is also provided. An interchangeable optical unit 10 containing the shutter and the lens is detachably mounted on the front face of the camera. Since the details of such a unit (except for the connections of the motion-transmitting parts as further mentioned below) are unimportant for purposes of the present invention, such details may take many forms, and the details here shown or described are intended merely as typical examples. Thus for instance the interchangeable unit 10 may include a shutter setting ring 81 and a diaphragm aperture setting ring 83, the ring 81 bearing a circumferentially graduated shutter speed scale 85, and the ring 83 bearing a circumferentially graduated diaphragm aperture scale 87, both of these scales being readable in connection with an index mark 89 carried by a fixed part of the objective housing. Rotatably mounted at the forward end of the interchangeable unit 10 there may be a focusing ring 91 bearing a circumferentially graduated focusing distance scale 93 suitably graduated in terms of meters, as shown, or any other suitable unit of distance and readable in connection with a fixed mark 95 carried by a stationary portion of the objective. As will be readily understood by those familiar with the art, the shutter speed and diaphragm aperture are set by rotating the respective rings 81 and 83, and the correct focus is achieved by rotating the focusing ring 91, this rotation serving to adjust axially a lens tube which is operatively connected to the ring 91 and which carries the objective lenses.

As better seen in FIG. 2, the interchangeable unit 10 is conveniently detachably mounted on the camera body 71 by a bayonet joint. The front of the camera body is provided with a bayonet connection plate 42 suitably firmly mounted in fixed position on the front of the camera, and has circumferentially spaced flanges which are undercut or overhanging as at 44. These flanges meet with and retain a plurality of bayonet connection wings 32 carried by the bayonet connection plate 28 mounted on the interchangeable unit. By moving the objective axially toward the front of the camera in proper alinement with the optical axis of the camera, and with the wings 32 oriented to aline with the spaces between the overhanging bayonet edges and the camera body, the bayonet connection plate 28 of the objective can be brought against the bayonet connection plate 42 of the camera body. The objective may then be turned in a clockwise direction (when viewed from the front) until the wings 32 pass into and are retained by the bayonet slots 44 on the camera body, the ultimate or final position being determined by contact of one of the wings 32 with a suitable stop on the camera body.

The exact details of the internal construction of the unit 10 are not important for purposes of the present invention except that the objective contains either a diaphragm which is controlled by, or a shutter which is to be tensioned or cocked by, the turning of a shaft which extends out through the back of the interchangeable unit and which is arranged parallel to the optical axis of the unit. Usually the unit contains both a diaphragm and a shutter, but the invention is applicable to either one alone. The control shaft is indicated at 20 in FIG. 2. The objective preferably has the construction disclosed in greater detail in applicant's copending U.S. patent application, Serial No. 514,218, filed June 9, 1955 (now Patent 2,900,885, granted August 25, 1959), and in U.S. Patent 2,849,938, issued September 2, 1958, for an invention of applicant and a co-worker of applicant. The shaft 20 of the present drawings corresponds for example to the shaft 20 shown in FIGS. 1, 2, 4, and 7 to 9 of the aforementioned application, and to the shaft 20 in FIGS. 1 and 13 and elsewhere of the aforementioned patent. This shaft has fixed to its forward end a gear not here shown but corresponding to the gear 22 disclosed in both the mentioned application and patent which, upon rotation of the shaft 20, serves to tension or cock the master member of the shutter and to perform other functions.

The camera in FIG. 1 is preferably of the type in which the shutter is tensioned or cocked simultaneously with the movement of the film from one frame to the next by operation of the film winding knob 73. The shutter operating shaft 20 provides the final element in the transmission train between the shutter or other interchangeable unit and the film feeding mechanism and other operating mechanism within the camera body operated by rotation of the film winding knob 73. The rear end of the operating shaft 20 extends out through the back wall of the shutter casing and carries an end-piece or coupling member 24 fixed to the shaft, the rear part of the end-piece being cut away at two opposite sides so as to leave a diametrically extending tongue or tooth or rib 26. The coupling end 24 extends through and is rotatable in the bayonet connection plate 28 which is permanently mounted in fixed position on the rear lens tube 12 of the shutter and is held thereon by means of a threaded clamping ring.

To provide a portion of the transmission train on the camera body for disengagingly receiving the tooth 26, a coupling end-piece or clutch member 46 which constitutes, in effect, a shaft and is rotatably mounted on the bayonet connection plate 42 on the camera body for rotation about an axis parallel to the optical axis of the camera and the detachable unit. The coupling end-piece 46 extends out through the front of the plate 42, and the front end of this piece is provided with a diametrical slot 50 of a size to receive the coupling tooth 26 on the piece 24, when the slot and the coupling tooth are alined with each other. This shaft 46 is coupled through a control shaft 46' in a manner to be described with the film feeding mechanism or other operating mechanism within the camera body, so as to be turned in one direction, for instance, a counterclockwise direction, during the operation of, for example, the film feeding means, and to turn back in the opposite direction, for example, in a clockwise direction, when the shutter is tripped to make an exposure.

If the interchangeable unit includes a shutter (as is usually the case) it is desirable in some camera constructions to have the unit detachable from the camera body only when the shutter is in tensioned position, while in other constructions it is desirable to have the interchangeable unit detachable only when the shutter is in run-down or rest position. Or if the interchangeable unit includes an adjustable diaphragm without a shutter, some constructions may require the unit to be detachable only when the diaphragm is at maximum aperture, others may demand minimum aperture as a condition precedent to removal of the unit. All of these variables are immaterial so far as the present invention is concerned, the point being that, regardless of what parts or mechanism the shaft 20 may control within the detachable unit 10, a particular rotary position of orientation of the shaft 20 and shaft 46 is chosen as the position in which detachability is to be permitted or allowed, and the clutch tooth 26 and cooperating clutch slot 50 are so oriented on their respective shafts that they will be in a tangential position (with respect to the optical axis) when the conditions for removability are met, and will be in a non-tangential position when such conditions are not met. Thus in the typical situation of a shutter which is to be tensioned by rotation of the shafts 20 and 46' in one direction and to be released for making an exposure by rotation thereof in the opposite direction, and which is to be removable from the camera only when in its tensioned or cocked condition, the parts are so arranged that when the shaft 46' has been turned to tension or cock the shutter, the slot 50 lies tangential to a circle drawn through the shaft concentric with the optical axis of the camera, in the position shown in FIG. 2, and when the parts assume the rundown or rest position at the conclusion of making an exposure, the slot 50 lies at a substantial angle to the tangential position.

In this shutter tensioned position, with the coupling tooth 26 and the slot 50 arranged tangential to the optical axis, it is evident that the interchangeable unit 10 may be detached and removed from the camera body simply by rotating the unit 10 relative to the camera body to disengage the bayonet connection 32, 44. Another interchangeable unit may, of course, be inserted on the camera when the coupling tooth and slot are alined tangentially. If the shaft 46' is not in its tensioned or cocked position, but is in the rundown or rest position, then the objective cannot be removed because the direction of the slot 50 prevents the objective from being turned relative to the camera body to release the bayonet connection between the two. Also, if it is attempted to attach to the camera an objective which is in its rundown or rest postion rather than in a tensioned position, the shutter cannot be attached because the tooth 26 will not be able to enter the notch 50 regardless of the position in which the shaft 46' may be.

While this interlocking arrangement is very advantageous under normal circumstances, there are some occasions when some breakage or other fault occurs, either within the camera body or within the unit 10, which prevents one or the other of the coupling members 24, 46 from turning to the tangential position required for disengagement.

The present invention provides an arrangement whereby either the coupling tooth 26 or the slot 50 may be retracted out of engagement with the other, so that the unit 10 may be removed even though the tooth and slot are not in tangential alinement. In the embodiment shown in FIG. 2, the coupling end 46 is arranged to be retractable within the camera body. For this purpose, the end-piece 46 has a non-circular (e.g., square) portion which is telescopically received within a similarly shaped axial opening in the shaft 46', the two parts 46 and 46' being engaged for rotation one with the other.

To provide a decoupling mechanism for retracting the end-piece 46 inwardly within the camera body when the parts are not operating properly, a decoupling plate 60 is provided and extends substantially perpendicular to the shaft 46' within the space 62, one end of the plate 60 being notched away as shown in FIG. 3 and engaged in a peripheral groove 46a in the end-piece 46. The decoupling plate 60 is arranged to be pushed inwardly by manually accessible means engageable from the outside of the camera. To this end, a push button 60b is secured to the plate 60 and projects through the camera front so that it can be depressed by the finger of a photographer using the camera. The decoupling plate 60 is prevented from rotating by being developed as a triangular plate having two spaced projections 60a which cooperate with one of the camera walls and are slidable along such wall.

Conveniently, to provide a mounting for a spring for urging the decoupling plate 60 and the coupling end 46 to a normal outward position, the shaft of the push button 60b extends through the plate 60 and is slidable in an aperture in a camera cross partition 72. Extending between the partition 72 and the plate 60 is a spring 64 which is constantly under compression urging the plate 60 toward the bayonet connection plate 42. The slot 50 is thus urged axially forward into normal coupling position.

If the mechanism either in the camera body or in the interchangeable unit is out of order and the coupling tooth 26 and slot 50 are prevented from taking the tangential position required for normal disengagement, then rearward pressure on the button 60b causes the coupling end 46 to be withdrawn as the decoupling plate 60 moves inwardly against the force of the spring 64 and the square end of the end-piece 46 slides within the square socket in the shaft 46'. The interchangeable unit 10 may then be twisted in the bayonet ring and thus detached from the camera even if the tooth 26 and slot 50 happen to be in a position other than tangential to the optical axis.

In FIGS. 4 and 5 is illustrated a second embodiment of the invention. In this embodiment the bushing or coupling end 24 in the interchangeable unit is arranged to be telescopically retracted on the shaft 20 to withdraw the coupling tooth 26 from engagement with the slot 50. To facilitate this operation, the bushing 24 is provided with a non-circular central bore in which the correspondingly non-circular end of the shaft 20 is slidably received. A spring 64' surrounds the shaft 20 and urges the bushing 24 outwardly to its normal position wherein a flange on the bushing engages the bayonet connection plate 28. To enable the bushing 24 to be retracted against the force of the spring 64' by manual pressure applied outside the unit 10, a double armed lever 66 is provided, extending through a slot in the bayonet connection plate 28 and pivoted to material forming one wall of this slot. The inwardly projecting arm 66a of the lever engages in a peripheral groove 24a in the bushing 24. The other arm 66b extends outwardly to be accessible from the exterior of the unit and is provided with an enlarged finger piece. By pressing rearwardly on the arm 66b, it can be seen that the other arm 66a urges the bushing 24 forwardly to retract the coupling tooth 26 from the slot 50.

The operation of the second embodiment of FIGS. 3 and 4 is substantially similar to that previously described for FIGS. 1 and 2. Should the camera parts of the mechanism of the interchangeable unit be jammed so that either one or the other of the coupling tooth 26 and slot 50 cannot assume the predetermined tangential operational position wherein the interchangeable unit may be twisted and removed from the camera body, the arm 66b of the decoupling lever 66 is moved to retract the bushing 24 against the force of the spring 64' thereby to withdraw the coupling tooth 26 from engagement with the slot 50. Thereafter the objective unit 10 may be rotated to disengage the bayonet joint 32, 34 so that it may be withdrawn axially away from the camera body.

The invention simply and conveniently provides a mechanism wherein the interchangeable optical unit normally cannot be removed from and inserted on the camera body unless the mechanism within the unit and within the camera body and the transmission chain between them are in a predetermined operational position, but they may be disengaged should a jamming of the parts occur such that the various parts and the transmission chain cannot take this predetermined operational position. The invention may also be applied in substantially the same manner to interchangeable units of the type having two or more transmission shafts between the unit and the camera body, each shaft then having its own disengageable clutch coupling. The decoupler may be designed simultaneously to release all the couplings.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a camera body and an interchangeable objective unit containing a shutter, means for detachably securing said objective to said camera body, said objective being removable by rotative movement and having an optical axis, an axially extending operating shaft for said shutter mounted rotatably in said objective unit, a control shaft mounted rotatably on said camera body in axial alinement with said operating shaft, coupling ends on said shafts having a diametrically extending tooth and slot in driving engagement for transmitting the rotation of one of said shafts to the other shaft, one of said coupling ends being telescopically mounted on its respective shaft, said coupling ends being arranged to be disengaged only when said shafts are in a predetermined operational position wherein said tooth and slot are tangential to the optical axis, removal of said objective unit being prevented by the locking engagement of said tooth and slot in positions other than said predetermined operational position, spring means for urging said coupling ends into driving engagement, and externally accessible manually operated decoupling means for retracting said one coupling end to release the driving engagement of said tooth and slot in positions other than tangential to the optical axis, so that said objective may be removed from the camera body when a fault arises.

2. A construction as defined in claim 1, wherein said one coupling end is received on said operating shaft, and said decoupling means is mounted on said objective unit.

3. A photographic camera comprising a camera body and an interchangeable objective unit containing a shutter, means for detachably securing said objective to said camera body, said objective having an optical axis, an axially extending operating shaft for said shutter mounted rotatably in said objective unit, a control shaft mounted rotatably on said camera body in axial alinement with said operating shaft, coupling ends on said shafts in driving engagement for transmitting rotation of one of said shafts to the other shaft, said coupling ends having interengaging parts arranged to be disengaged only when said shafts are in a predetermined operational position and serving as a locking means for preventing removal of said objective unit except when said shafts are in said predetermined operational position, one of said coupling ends being telescopically mounted on its respective shaft, spring means for urging said one coupling end into engagement with the other of said coupling ends, and externally accessible manually operated decoupling means acting in an axial direction for releasing the driving engagement of said one coupling end and operable in positions other than said predetermined operational position.

4. A construction as defined in claim 3, wherein said decoupling means comprises a non-rotatable plate secured to said one coupling end, means mounting said plate for axial displacement, and an externally accessible push button fastened to said plate and operable to produce said axial displacement.

5. A construction as defined in claim 3, wherein said decoupling means comprises a double-armed lever having one arm engaged with said one coupling end and having the other arm externally accessible for operation by digital pressure, and fixed fulcrum means for mounting said lever.

6. A photographic camera comprising a camera body and an interchangeable optical unit having an optical axis, means for detachably securing said optical unit to said camera body, said optical unit being removable by rotative movement, an axially extending operating shaft offset from said optical axis and mounted rotatably in said optical unit, a control shaft mounted rotatably on said camera body in axial alinement with said operating shaft, coupling ends on said shafts having a diametrically extending tooth and slot in driving engagement for transmitting the rotation of one of said shafts to the other shaft, one of said coupling ends being telescopically mounted on its respective shaft, said coupling ends being arranged to be disengaged only when said shafts are in a predetermined operational position wherein said tooth and slot are tangential to the optical axis, removal of said optical unit being prevented by the locking engagement of said tooth and slot in positions other than said predetermined operational position, and externally accessible manually operated decoupling means for retracting said one coupling end axially to release the driving engagement of said tooth and slot in positions other than tangential to the optical axis, said decoupling means comprising a decoupling plate secured to said one coupling end and mounted in said camera body so as to be non-rotatable, a push button fixed to said decoupling plate and extending through an aperture in said camera body to be accessible from the outside, and spring means for urging said one coupling end of said control shaft into driving engagement with the other coupling end of said operating shaft.

7. A construction as defined in claim 6, wherein said push button is extended rearwardly and is slidably received in a partition aperture, said spring means being received on said rearward extension of said push button reacting against said decoupling plate at one end and against said partition at its other end.

References Cited in the file of this patent
UNITED STATES PATENTS

| | | |
|---|---|---|
| 2,691,322 | Wittel | Oct. 12, 1954 |
| 2,849,938 | Gebele | Sept. 2, 1958 |